(12) United States Patent
Suzuki et al.

(10) Patent No.: US 11,477,748 B2
(45) Date of Patent: Oct. 18, 2022

(54) APPARATUS TO BE CONTROLLED, CONTROL METHOD, NON-TRANSITORY COMPUTER READABLE MEDIUM, AND REMOTE CONTROL SYSTEM

(71) Applicant: NEC Corporation, Tokyo (JP)

(72) Inventors: Takayuki Suzuki, Tokyo (JP); Hiroshi Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 134 days.

(21) Appl. No.: 17/251,581

(22) PCT Filed: Apr. 9, 2019

(86) PCT No.: PCT/JP2019/015505
§ 371 (c)(1),
(2) Date: Dec. 11, 2020

(87) PCT Pub. No.: WO2019/239697
PCT Pub. Date: Dec. 19, 2019

(65) Prior Publication Data
US 2021/0258903 A1 Aug. 19, 2021

(30) Foreign Application Priority Data
Jun. 13, 2018 (JP) .............................. JP2018-112819

(51) Int. Cl.
*H04W 56/00* (2009.01)
*G06N 20/00* (2019.01)
(52) U.S. Cl.
CPC .......... *H04W 56/004* (2013.01); *G06N 20/00* (2019.01); *H04W 56/001* (2013.01); *H04W 56/0055* (2013.01)

(58) Field of Classification Search
CPC ........ G06N 5/003; G06N 20/00; G06N 20/20; H04Q 9/00; H04W 56/001; H04W 56/004; H04W 24/08; H04W 56/0055
See application file for complete search history.

(56) References Cited

FOREIGN PATENT DOCUMENTS

JP 2008-118271 A 5/2008
JP 2008-311976 A 12/2008
(Continued)

OTHER PUBLICATIONS

International Search Report corresponding to PCT/JP2019/015505, dated Jun. 25, 2019 (3 pages).

*Primary Examiner* — Marsha D Banks Harold
*Assistant Examiner* — Dharmesh J Patel

(57) ABSTRACT

An apparatus to be controlled (40) is remotely controlled by a remote-control apparatus (10) through a wirelessly-connected communication network (20). The apparatuses (40) includes a delay measurement unit (403) configured to measure a communication delay, a logarithmic conversion unit (406A) configured to logarithmically convert the communication delay, a smoothing unit (406B) configured to smooth the communication delay, a radio-wave index value measurement unit (404) configured to measure a radio-wave index value, a model learning unit (406C) configured to generate a learning model, a communication delay estimation unit (407) configured to calculate an estimated communication delay value by using the learning model and the radio-wave index value, and a speed determination unit (408A) configured to calculate a second operation amount to be input to a drive unit (408B), based on the estimated communication delay value and a first operation amount input from the remote control apparatus (10).

9 Claims, 6 Drawing Sheets

(56) References Cited

FOREIGN PATENT DOCUMENTS

| | | |
|---|---|---|
| JP | 5565431 B2 | 8/2014 |
| JP | 2016-071585 A | 5/2016 |
| JP | 2017-034619 A | 2/2017 |
| JP | 2017-049903 A | 3/2017 |
| JP | 2017-092873 A | 5/2017 |

APPARATUS TO BE CONTROLLED, CONTROL METHOD, NON-TRANSITORY COMPUTER READABLE MEDIUM, AND REMOTE CONTROL SYSTEM

CROSS-REFERENCE TO RELATED APPLICATIONS

This application is a national stage application of International Application No. PCT/JP2019/015505, entitled, "APPARATUS TO BE CONTROLLED, CONTROL METHOD, NON-TRANSITORY COMPUTER READABLE MEDIUM, AND REMOTE-CONTROL SYSTEM," filed on Apr. 9, 2019, which claims priority to Japanese Patent Application No. 2018-112819, filed on Jun. 13, 2018. These applications are hereby incorporated by reference in their entirety.

TECHNICAL FIELD

The present invention relates to an apparatus to be controlled, a control method, a non-transitory computer readable medium, and a remote control system.

BACKGROUND ART

As wireless communication technology has advanced, wireless remote control technology by which apparatuses to be controlled such as unmanned vehicles, drones, remote surgery support robots, and construction equipment are wirelessly connected to a network and controlled through the network has been studied. Wireless remote control technology provides various advantages. For example, the introduction of moving apparatuses to be controlled is made easier, and the rearrangement of apparatuses to be controlled is made easier. Further, the weights of such apparatuses and the spaces necessary therefor can be reduced owing to the elimination of wiring lines.

In a wireless communication network, its radio-wave environment widely changes due to changes in the radio-wave condition caused by the movement of the apparatus to be controlled, reflection and diffraction of radio waves by objects near the apparatus to be controlled, the congestion state of the communication line, interference of radio waves emitted from other wireless access points, noises emitted from other apparatuses, and so on. As the radio-wave environment changes, the communication quality may deteriorate.

A radio-wave index value is used as an index for indicating the quality of radio waves. The radio-wave index value is an index value for evaluating a physical layer of wireless communication and is calculated based on the electric power of a signal received by a terminal. For example, in LTE (Long Term Evolution), which is currently standardized under 3GPP (Third Generation Partnership Project), an RSSI (Received Signal Strength Indicator), RSRP (Reference Signal Received Power), RSRQ (Reference Signal Received Quality), an SINR (Signal to Interference and Noise Ratio), and the like are specified.

In the remote control of an apparatus to be controlled through a wireless communication network, among the fluctuations of communication quality factors, the fluctuations of a communication delay pose a particularly serious problem. During a period in which no control command reaches the apparatus to be controlled, the apparatus to be controlled is in an inoperable state. Therefore, for example, when it is desired to move the apparatus to be controlled to a desired place, it is very difficult to accurately move the apparatus to be controlled in real time if a large communication delay occurs in the wireless communication network. Further, there is a possibility that the efficiency of work is lowered because, for example, the apparatus to be controlled repeatedly moves back and forth near the desired placed. Therefore, it has been studied to enable stable remote control even when a communication delay occurs between the remote control apparatus and the apparatus to be controlled, or even when such a communication delay fluctuates.

For example, Patent Literature 1 discloses that, in consideration of the maximum delay time allowed in a communication network, a period from a time when a remote control apparatus receives first data (measurement data) from a field apparatus to a time when the remote control apparatus starts generating second data (control data) is adjusted. Further, it is also mentioned that a delay compensation unit, which is designed by using a model of the flow rate of a fluid, which is an object to be controlled, and the maximum delay time allowed in the communication network, compensates for delays of the first and second data that could occur in the network. In this way, it is intended to stably carry out a control loop even when the field apparatus is controlled through the network (the communication network) that is unstable due to the fluctuations of the communication delay time.

Further, Patent Literature 2 discloses that a time when a controller transmits an operation command is defined as a start point and a period from the start point to a time when the operation command is actually received is defined as a communication delay time. Similarly, Patent Literature 3 discloses that a communication delay time is calculated by subtracting a transmission time indicated by transmission timing information from a reception time indicated by reception timing information.

Further, it has been studied to estimate communication quality by using a radio-wave index value. In a technique disclosed in Patent Literature 4, a terminal estimates an average value of communication delays and a throughput thereof based on a radio-wave index value and congestion information of a cell (number of connected terminals in a cell). Specifically, in the technique described in Patent Literature 4, firstly, a wireless access point notifies a traffic management server connected to a mobile core network of the congestion information of the cell. Next, the traffic management server notifies a predetermined terminal of the acquired congestion information of the cell. Next, the terminal estimates the average value of communication delays based on an SINR measured by the terminal itself and the acquired congestion information.

CITATION LIST

Patent Literature

Patent Literature 1: Japanese Patent No. 5565431
Patent Literature 2: Japanese Unexamined Patent Application Publication No. 2017-049903
Patent Literature 3: Japanese Unexamined Patent Application Publication No. 2016-071585
Patent Literature 4: Japanese Unexamined Patent Application Publication No. 2017-034619

SUMMARY OF INVENTION

Technical Problem

In the technique disclosed in Patent Literature 1, all communication delay times in a communication network are unified into an allowable maximum delay time. In this way, a delay time from when an operator inputs a control command to the controller to when the field apparatus starts operating becomes constant. Therefore, it is easy to operate the field apparatus as expected by the operator, and hence it is possible to reduce the amount of overshoot. However, in the technique described in Patent Literature 1, large communication delay times constantly occur irrespective of actual communication delay times. Therefore, the operability of the remote control system is restricted. Further, the operability of the remote control system is improved as the communication delay time is reduced. Therefore, in an environment in which the communication delay is small, it is undesirable to compensate for the delay by using the allowable maximum delay time as in case of the technique disclosed in Patent Literature 1.

Therefore, a method for reducing the overshoot, which occurs when the communication delay increases, while conforming to the changes in the communication delay is examined. If it is possible to get hold of the communication delay, it is possible to reduce the overshoot by lowering the operating speed of the apparatus to be controlled when the communication delay is long. Therefore, in this method, the challenge is how to get hold of the fluctuating communication delay.

For example, it is conceivable to adopt a method for measuring a communication delay by transmitting and receiving a measurement packet between the apparatus to be controlled and the controller as in the case of the techniques described in Patent Literatures 2 and 3. Specifically, it is conceivable to adopt a method for directly measuring a one-way communication delay from the controller to the apparatus to be controlled, or a method for indirectly measuring a one-way communication delay between the apparatus to be controlled and the controller by measuring a round-trip communication delay therebetween and dividing the measured round-trip communication delay by two.

In the former method in which the one-way delay is directly measured, the controller sends a measurement packet and its transmission time to the apparatus to be controlled, and the apparatus to be controlled calculates a communication delay by calculating a difference between the reception time of the measurement packet and the transmission time sent from the controller. However, strictly speaking, the clocks of the controller and the apparatus to be controlled are different from each other. Therefore, it is difficult to accurately measure the communication delay by this method.

Further, in the latter method in which the one-way delay is calculated by measuring the round-trip delay, it is necessary to transmit a measurement packet from the apparatus to be controlled to the controller. Therefore, the power consumption of the apparatus to be controlled increases due to the measurement of the communication delay. Since the power source of the apparatus to be controlled is a battery and the available power is limited, it is desired to reduce the power consumption.

Therefore, it is desired to get hold of the communication delay without transmitting and receiving a measurement packet between the apparatus to be controlled and the controller. For example, it is possible to estimate a delay time without transmitting a packet from the apparatus to be controlled by using the technique disclosed in Patent Literature 2.

However, when an average value of communication delays is estimated based on a radio-wave index value in an application of a terminal, there is a problem that it is difficult to conform to the fluctuations of the communication time, which widely changes over time, because the sampling rate of the radio-wave index value is low. Further, there is a problem that since the radio-wave index value is output in the form of logarithm, the range of fluctuations of the delay does not conform to that of the radio-wave index value expressed in the form of logarithm.

Therefore, it is desired to accurately estimate a delay time without transmitting a packet from the apparatus to be controlled to the remote control apparatus. Further, it is desired to improve the efficiency of work in the wireless remote control by reducing the amount of an operation (the amount of a control operation) based on the accurately-estimated delay time.

An object of the present disclosure is to provide an apparatus to be controlled, a control method, a non-transitory computer readable medium, and a remote control system capable of accurately estimating a delay time and improving the efficiency of work.

Solution to Problem

An apparatus to be controlled according to a first aspect of the present invention is an apparatus to be controlled wirelessly connected to a communication network and remotely controlled by a remote control apparatus through the communication network, the apparatuses to be controlled including: a delay measurement unit configured to measure a communication delay between the remote control apparatus and the apparatus to be controlled; a logarithmic conversion unit configured to logarithmically convert the measured communication delay; a smoothing unit configured to smooth the logarithmically-converted communication delay; a radio-wave index value measurement unit configured to measure a radio-wave index value; a model learning unit configured to generate a learning model by which a logarithmically-converted and smoothed communication delay is estimated by using the measured radio-wave index value; a communication delay estimation unit configured to calculate an estimated communication delay value by using the learning model and the radio-wave index value; and an operation amount calculation unit configured to calculate a second operation amount based on the estimated communication delay value and a first operation amount, the first operation amount being an operation amount input from the remote control apparatus, and the second operation amount being an operation amount that is input to a drive unit.

A remote control method according to a second aspect of the present invention is a control method performed by an apparatus to be controlled wirelessly connected to a communication network and remotely controlled by a remote control apparatus through the communication network, the control method including: measuring, by the apparatus to be controlled, a communication delay between the remote control apparatus and the apparatus to be controlled; logarithmically converting, by the apparatus to be controlled, the measured communication delay; smoothing, by the apparatus to be controlled, the logarithmically-converted communication delay; measuring, by the apparatus to be controlled, a radio-wave index value; generating, by the apparatus to be controlled, a learning model by which a logarithmically-converted and smoothed communication delay is estimated by using the measured radio-wave index value; calculating, by the apparatus to be controlled, an estimated communication delay value by using the learning model and the radio-wave index value; and calculating, by the apparatus to be controlled, a second operation amount based on the estimated communication delay value and a first operation amount, the first operation amount being an operation amount input from the remote control apparatus, and the second operation amount being an operation amount that is input to a drive unit.

A non-transitory computer readable medium according to a third aspect of the present invention stores a control program for an apparatus to be controlled wirelessly connected to a communication network and remotely controlled by a remote control apparatus through the communication network, the control program being adapted to cause a computer to perform: a process for measuring a communication delay between the remote control apparatus and the apparatus to be controlled; a process for logarithmically converting the measured communication delay; a process for smoothing the logarithmically-converted communication delay; a process for measuring a radio-wave index value; a process for generating a learning model by which a logarithmically-converted and smoothed communication delay is estimated by using the measured radio-wave index value; a process for calculating an estimated communication delay value by using the learning model and the radio-wave index value; and a process for calculating a second operation amount based on the estimated communication delay value and a first operation amount, the first operation amount being an operation amount input from the remote control apparatus, and the second operation amount being an operation amount that is input to a drive unit.

A remote control system according to a fourth aspect of the present invention is a remote control system including: a remote control apparatus; and an apparatus to be controlled connected to the remote control apparatus through a communication network, in which the apparatus to be controlled is wirelessly connected to the communication network, and the apparatus to be controlled includes: a delay measurement unit configured to measure a communication delay between the remote control apparatus and the apparatus to be controlled; a logarithmic conversion unit configured to logarithmically convert the measured communication delay; a smoothing unit configured to smooth the logarithmically-converted communication delay; a radio-wave index value measurement unit configured to measure a radio-wave index value; a model learning unit configured to generate a learning model by which a logarithmically-converted and smoothed communication delay is estimated by using the measured radio-wave index value; a communication delay estimation unit configured to calculate an estimated communication delay value by using the learning model and the radio-wave index value; and an operation amount calculation unit configured to calculate a second operation amount based on the estimated communication delay value and a first operation amount, the first operation amount being an operation amount input from the remote control apparatus, and the second operation amount being an operation amount that is input to a drive unit.

Advantageous Effects of Invention

It is possible to provide an apparatus to be controlled, a remote control method, a non-transitory computer readable medium, and a remote control system capable of accurately estimating a delay time and improving the efficiency of work.

DESCRIPTION OF EMBODIMENTS

Example embodiments according to the present invention will be described hereinafter with reference to the drawings.

Figure 1:
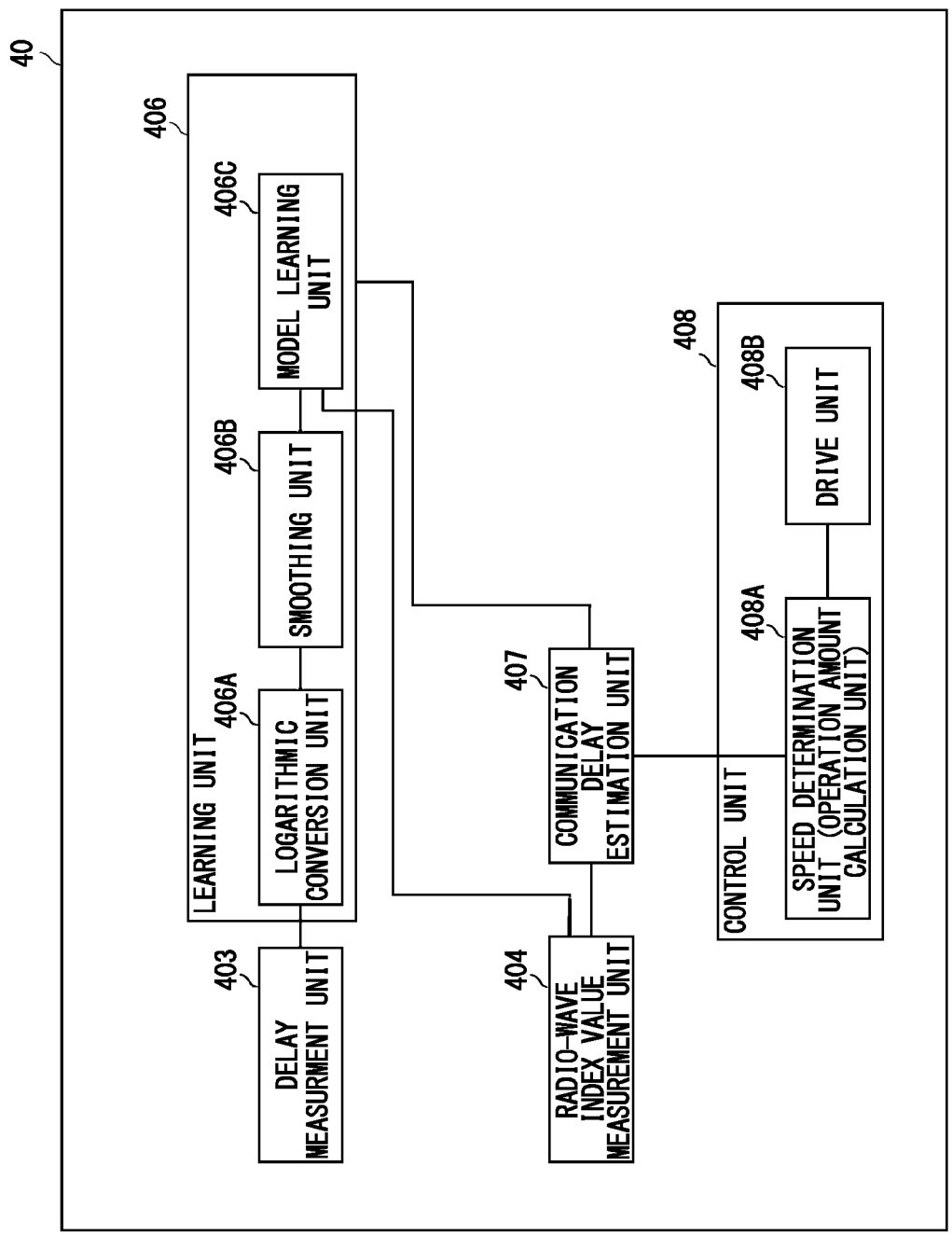
FIG. 1 is a block diagram showing an example of an apparatus to be controlled according to the present invention.

FIG. 1 is a block diagram showing an example of an apparatus to be controlled 40 according to the present invention. As shown in FIG. 1, the apparatus to be controlled 40 includes a delay measurement unit 403, a radio-wave index value measurement unit 404, a learning unit 406, a communication delay estimation unit 407, and a control unit 408. Further, the learning unit 406 includes a logarithmic conversion unit 406A, a smoothing unit 406B, and a model learning unit 406C. Further, the control unit 408 includes a speed determination unit 408A, which serves as an operation-amount calculation unit, and a drive unit 408B.

Further, the apparatus to be controlled 40 is connected to a remote control apparatus 10 (which will be described later) through a communication network 20 (which will be described later) so that the apparatus to be controlled 40 can communicate with the remote control apparatus 10. Further, the apparatus to be controlled 40 is wirelessly connected to the communication network 20. Further, the apparatus to be controlled 40 is remotely controlled by the remote control apparatus 10 through the communication network 20.

The delay measurement unit 403 measures a communication delay between the remote control apparatus 10 and the apparatus to be controlled 40. Further, the delay measurement unit 403 inputs (i.e., provides) the measured communication delay to the logarithmic conversion unit 406A of the learning unit 406.

The radio-wave index value measurement unit 404 measures a radio-wave index value. Further, the radio-wave index value measurement unit 404 inputs the measured radio-wave index value to the model learning unit 406C.

The logarithmic conversion unit 406A logarithmically converts the communication delay measured by the delay measurement unit 403. Further, the logarithmic conversion unit 406A inputs the logarithmically-converted communication delay to the smoothing unit 406B.

The smoothing unit 406B smooths the communication delay that has been logarithmically-converted by the logarithmic conversion unit 406A. Further, the smoothing unit 406B inputs the smoothed communication delay to the model learning unit 406C.

The model learning unit 406C generates a learning model by which a logarithmically-converted and smoothed communication delay is estimated by using the radio-wave index value.

The communication delay estimation unit 407 calculates an estimated communication delay value by using the learning model generated by the model learning unit 406C and the radio-wave index value. Further, the communication delay estimation unit 407 inputs the estimated communication delay value to the speed determination unit 408A.

The speed determination unit 408A calculates a second operation amount that will be input to the drive unit 408B based on the estimated communication delay value estimated by the communication delay estimation unit 407 and a first operation amount input from the remote control unit 10. Specifically, when the estimated communication delay value exceeds a predetermined value, the speed determination unit 408A calculates, as an operation amount that will be input to the drive unit 408B, a second operation amount smaller than the first operation amount input from the remote control apparatus 10.

According to the apparatus to be controlled 40 in accordance with the present invention described above, an estimated communication delay value can be calculated by using the radio-wave index value and the learning model. That is, the estimated communication delay value can be calculated without transmitting a packet from the apparatus to be controlled 40 to the remote control apparatus 10. Further, the estimated communication delay value can be accurately calculated by using the learning model. Further, it is possible to appropriately calculate a second operation amount that will be input to the drive unit 408B based on the accurately-calculated estimated communication delay value and the first operation amount input from the remote control apparatus 10. Therefore, it is possible to improve the efficiency of work performed by the apparatus to be controlled 40. As a result, it is possible to provide an apparatus to be controlled 40 capable of accurately estimating a delay time and improving the efficiency of work.

First Example Embodiment

Figure 2:
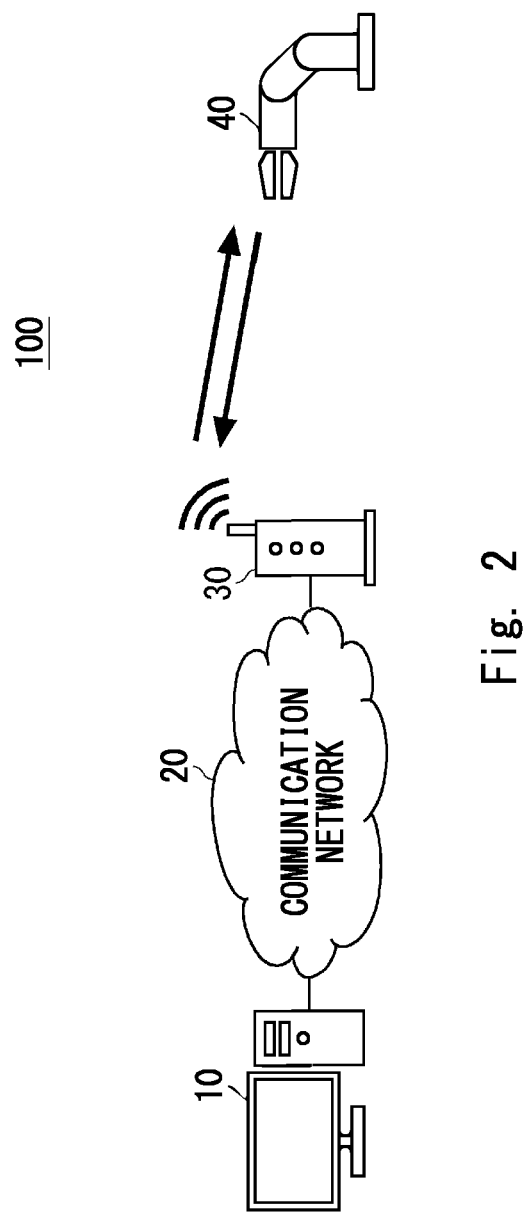
FIG. 2 shows an example of a remote control system according to a first example embodiment of the present invention.

A remote control system 100 according to a first example embodiment of the present invention will be described. FIG. 2 shows an example of the remote control system 100 according to the first example embodiment. As shown in FIG. 2, the remote control system 100 includes a controller 10, which serves as a remote control apparatus, a communication network 20, a wireless access point 30, an apparatus to be controlled 40, and the like.

The controller 10 is connected to the apparatus to be controlled 40 through the communication network 20 so that the controller 10 can communicate with the apparatus to be controlled 40. Further, the apparatus to be controlled 40 is wirelessly connected to the communication network 20 through the wireless access point 30 so that the apparatus to be controlled 40 can wirelessly communicate with the wireless access point 30. That is, the apparatus to be controlled 40 is connected to the controller 10 through the wireless access point 30 and the communication network 20 so that the apparatus to be controlled 40 can communicate with the controller 10. Further, when the controller 10 remotely controls the apparatus to be controlled 40, the apparatus to be controlled 40 estimates a communication delay between the controller 10 and the apparatus to be controlled 40.

Then, when the estimated communication delay is long, the apparatus to be controlled 40 adjusts its own operating speed in order to reduce the amount of overshoot. Control for the apparatus to be controlled 40 will be described hereinafter.

Figure 3:
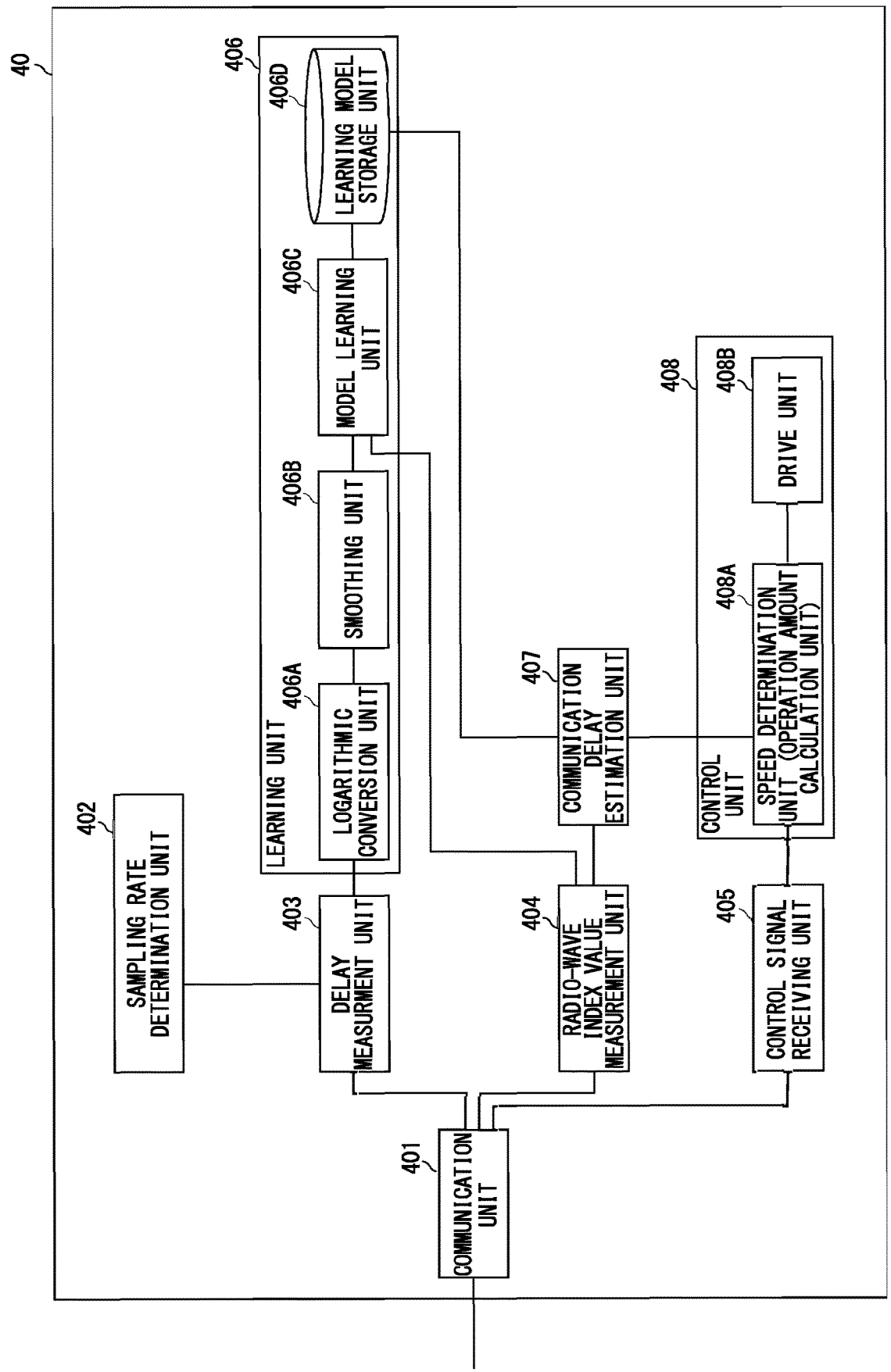
FIG. 3 is a block diagram showing an example of an apparatus to be controlled according to the first example embodiment of the present invention.

FIG. 3 shows an example of the apparatus to be controlled 40 according to the first example embodiment.

As shown in FIG. 3, the apparatus to be controlled 40 includes a communication unit 401, a sampling rate determination unit 402, a delay measurement unit 403, a radio-wave index value measurement unit 404, a control signal receiving unit 405, a learning unit 406, a communication delay estimation unit 407, and a control unit 408.

The communication unit 401 wirelessly communicates with the wireless access point 30. In this way, the apparatus to be controlled 40 is connected to the wireless access point 30 so that the apparatus to be controlled 40 can communicate with the wireless access point 30 through wireless communication. For example, the communication unit 401 inputs a control signal transmitted from the controller 10 through the communication network 20 and the wireless access point 30 to the control signal receiving unit 405. Further, the communication unit 401 inputs measurement data (which will be described later) transmitted from the controller 10 through the communication network 20 and the wireless access point 30 to the delay measurement unit 403. Further, the communication unit 401 inputs a radio signal transmitted from the wireless access point 30 to the radio-wave index value measurement unit 404.

The sampling rate determination unit 402 determines a sampling rate at which the delay measurement unit 403 measures a communication delay, and notifies the delay measurement unit 403 of the determined sampling rate. Details of the method for determining a sampling rate performed by the sampling rate determination unit 402 will be described later.

The delay measurement unit 403 measures a communication delay by transmitting/receiving measurement data for measuring a communication delay to/from the controller 10. Specifically, the delay measurement unit 403 transmits/receives measurement data to/from the controller 10 through the communication unit 401, the wireless access point 30, and the communication network 20. Further, the delay measurement unit 403 calculates a round-trip delay time from a difference between a transmission time of measurement data and a reception time thereof, and measures a communication delay based on the calculated round-trip delay time. Note that a half of the round-trip delay time can be used as the communication delay.

The radio-wave index value measurement unit 404 measures a radio-wave index value by using a radio signal sent from the wireless access point 30. Note that the radio-wave index value is, for example, an RSSI (Received Signal Strength Indicator), RSRP (Reference Signal Received Power), RSRQ (Reference Signal Received Quality), an SINR (Signal to Interference and Noise Ratio), or the like.

The control signal receiving unit 405 receives the control signal transmitted from the controller 10 and converts the received control signal into a first operation amount x which is, for example, the number of revolutions of a motor or the like. Further, the control signal receiving unit 405 inputs the first operation amount x to the speed determination unit 408A of the control unit 408.

The learning unit 406 uses the radio-wave index value output from the radio-wave index value measurement unit 404 as an explanatory variable and the communication delay output from the delay measurement unit 403 as an objective variable, and generates a learning model for estimating a communication delay based on the radio-wave index value measured by the radio-wave index value measurement unit 404.

Specifically, the learning unit 406 includes a logarithmic conversion unit 406A, a smoothing unit 406B, a model learning unit 406C, and a learning model storage unit 406D. Further, the learning unit 406 includes a CPU (Central Processing Unit) 501, a storage unit 502, and a communication interface 503, and the like. Further, all the processing in the learning unit 406 is carried out as the CPU 501 executes a program stored in the storage unit 502.

Further, a program stored in its respective storage unit 502 of the learning unit 406 includes code for carrying out its respective processing in the learning unit 406 as executed by the CPU 501. Note that the storage unit 502 includes, for example, an arbitrary storage device capable of storing the above-described program and various types of information used for processing performed by the learning unit 406. The storage device is, for example, a memory or the like.

The above-described program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The logarithmic conversion unit 406A calculates a logarithm of the communication delay measured by the delay measurement unit 403. By expressing the communication delay in the form of logarithm, it is possible to conform to the range of fluctuations of the communication delay to that of fluctuations of the radio-wave index value expressed in the form of logarithm. The logarithmic conversion unit 406A inputs the logarithmically-converted communication delay to the smoothing unit 406B.

The smoothing unit 406B smooths the logarithm of the communication delay calculated by the logarithmic conversion unit 406A. Note that the smoothing unit 406B may smooth the communication delay by making time-series data of the logarithm of the communication delay pass through a low-pass filter. Alternatively, the smoothing unit 406B may smooth the communication delay by calculating a moving average of the time-series data of the logarithm of the communication delay. Alternatively, the smoothing unit 406B may smooth the communication delay by using other methods. The smoothing unit 406B inputs the smoothed communication delay to the model learning unit 406C.

The model learning unit 406C performs machine learning for estimating a communication delay by using the logarithmically-converted and smoothed communication delay as an objective variable and the radio-wave index value input from the radio-wave index value measurement unit 404 as an explanatory variable. Note that the learning model used in the machine learning may be a regression model using a random forest, a multiple regression model, or other models. The model learning unit 406C inputs the learning model that has been generated by performing the machine learning in a predetermined period or for a predetermined number of samples to the learning model storage unit 406D.

The learning model storage unit 406D stores the learning model generated by the model learning unit 406C.

The communication delay estimation unit 407 calculates an estimated communication delay value by using the learning model generated by the model learning unit 406C and the radio-wave index value. Specifically, when the control signal receiving unit 405 receives a control signal, the communication delay estimation unit 407 estimates an estimated communication delay value $d_{est}$ based on the radio-wave index value measured by the radio-wave index value measurement unit 404 by using the learning model stored in the learning model storage unit 406D. Further, the communication delay estimation unit 407 inputs the estimated communication delay value $d_{est}$ to the speed determination unit 408A of the control unit 408.

Similarly to the learning unit 406, the control unit 408 includes a CPU 501, a storage unit 502, a communication interface 503, and the like. Further, all the processing in the control unit 408 is carried out as the CPU 501 executes a program stored in the storage unit 502. Specifically, processing in each unit of the apparatus to be controlled 40 is carried out as the CPU 501 executes a program stored in the storage unit 502.

Further, a program stored in its respective storage unit 502 of the control unit 408 includes code for carrying out its respective processing in the control unit 408 as executed by the CPU 501. Note that the storage unit 502 includes, for example, an arbitrary storage device capable of storing the above-described program and various types of information used for processing performed by the control unit 408. The storage device is, for example, a memory or the like.

Figure 4:
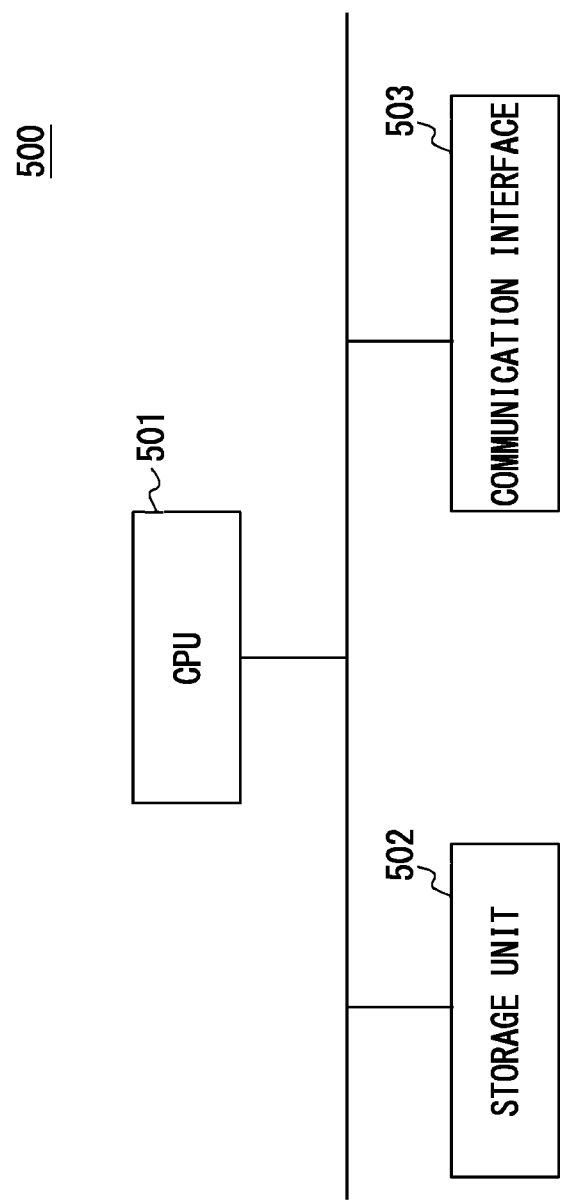
FIG. 4 is a block diagram showing a hardware configuration of an information processing apparatus capable of carrying out processing in the apparatus to be controlled according to the first example embodiment of the present invention.

Note that the learning unit 406 and the control unit 408 may be provided as one component in the apparatus to be controlled 40. That is, the processing of the learning unit 406 and the control unit 408 may be carried out by one information processing apparatus 500 shown in FIG. 4.

Specifically, the control unit 408 determines, for example, a second operation amount y that will be input to the drive unit 408B based on the first operation amount x and the estimated communication delay value $d_{est}$, and thereby drives the apparatus to be controlled. More specifically, the control unit 408 includes a speed determination unit 408A, which serves as an operation amount calculation unit, and a drive unit 408B.

The speed determination unit 408A calculates the second operation amount y that is input to the drive unit 408B by using the first operation amount x input from the control signal receiving unit 405 and the estimated communication delay value $d_{est}$ input from the communication delay estimation unit 407. Specifically, the speed determination unit 408A calculates a second operation amount y for operating the apparatus to be controlled by using the below-shown Expressions (1) and (2).

[Expression 1]

$$f(d_{est}, x_{max}) = \begin{cases} x_{max} & (d_{est} \leq d_{th}) \\ \dfrac{d_{th}}{d_{est}} \cdot x_{max} & (d_{th} < d_{est}) \end{cases} \quad (1)$$

[Expression 2]

$$y = \min[x, f(d_{est}, x_{max})] \quad (2)$$

In the expressions, $d_{th}$ ($d_{th}$>0) is a parameter representing the logarithm of the upper limit of the communication delay with which an operator of the apparatus to be controlled 40 can operate the apparatus to be controlled 40 without feeling something is wrong. Further, $x_{max}$ is an upper limit value of the first operation amount x that is obtained by converting the control signal transmitted from the controller 10 to the apparatus to be controlled 40. The parameters dui and $x_{max}$ may have fixed values or variable values. The drive unit 408B operates according to the second operation amount y calculated by the speed determination unit 408A. For example, in the case where the drive unit 408B is a motor, it rotates at a rotation speed determined by the second operation amount y.

Note that when the delay measurement unit 403 measures a communication delay at a sampling rate lower than the radio-wave index value, it cannot conform to the fluctuations of the delay. Therefore, the accuracy of the estimation of the communication delay in the communication delay estimation unit 407 deteriorates. Meanwhile, the fluctuations of the radio-wave index value, which is the explanatory variable, are small. Therefore, even if the sampling rate of the measurement of the communication delay performed by the delay measurement unit 403 is excessively increased relative to the radio-wave index value, the accuracy of the estimation of the communication delay by the communication delay estimation unit 407 is hardly improved. Further, if the sampling rate of the measurement of the communication delay performed by the delay measurement unit 403 is excessively increased, the power required for the measurement of the communication delay and the consumption of the radio frequency resources of the wireless access point 30 increase. Therefore, the sampling rate determination unit 402 determines the sampling rate of the measurement of the communication delay performed by the delay measurement unit 403 according to the sampling rate of the radio-wave index value, and notifies the delay measurement unit 403 of the determined sampling rate. The sampling rate of which the sampling rate determination unit 402 notifies the delay measurement unit 403 may have a predetermined value, a value equal to that of the sampling rate of the radio-wave index value measured by using a special terminal capable of directly acquiring the radio-wave index value output from the chipset, or a value determined by other methods.

Figure 5:
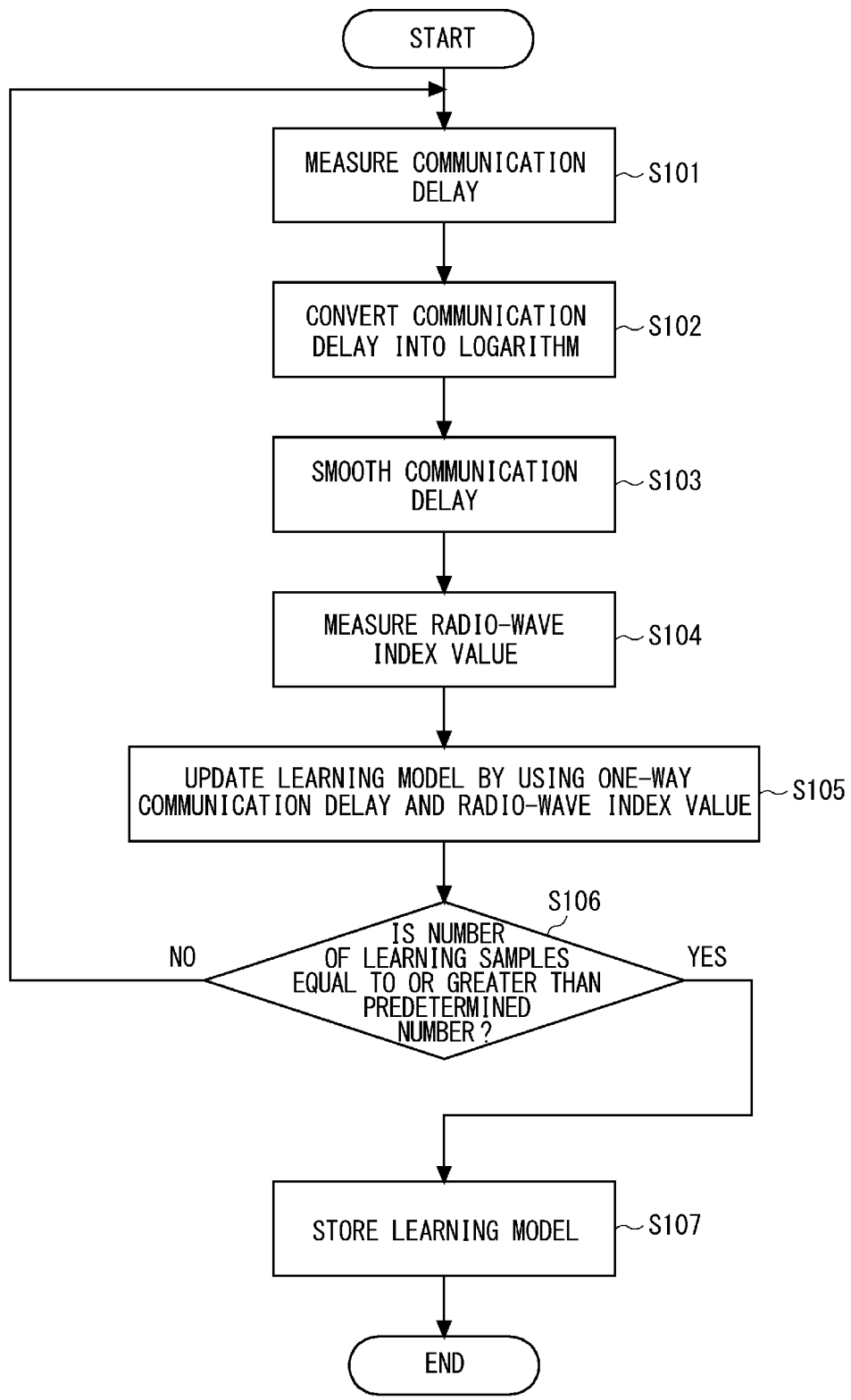
FIG. 5 is a flowchart for explaining a control method performed in the apparatus to be controlled according to the first example embodiment of the present invention.
Figure 6:
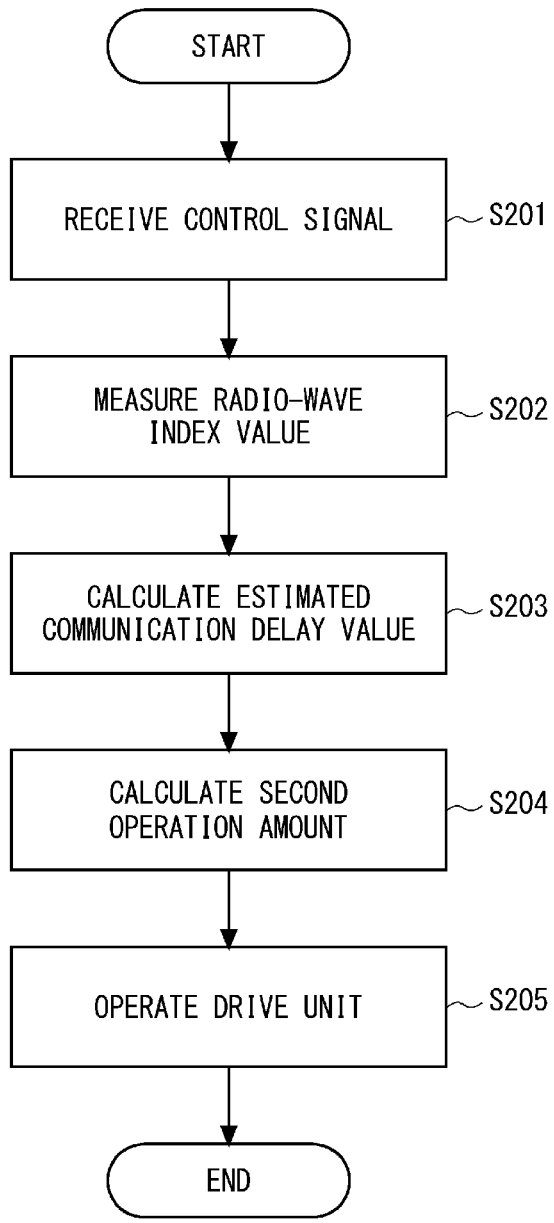
FIG. 6 is a flowchart for explaining a control method implemented in the apparatus to be controlled according to the first example embodiment of the present invention.

Next, a control method performed by the apparatus to be controlled 40 according to the first example embodiment will be described with reference to FIGS. 5 and 6. FIG. 5 is a flowchart for explaining a method for generating a learning model in the learning unit 406 of the apparatus to be controlled 40. Further, FIG. 6 is a flowchart showing a method for controlling the drive unit 408B in the apparatus to be controlled 40.

Firstly, a method for generating a learning model will be described with reference to FIG. 5. Firstly, the delay measurement unit 403 measures a communication delay between the controller 10 and the apparatus to be controlled 40 according to the sampling rate determined by the sampling rate determination unit 402 (step S101). Specifically, the delay measurement unit 403 transmits a packet to the controller 10 and stores its transmission time. The controller 10 receives the packet transmitted from the apparatus to be controlled 40 and transmits a response packet to that packet to the apparatus to be controlled 40. The apparatus to be controlled 40 receives the packet transmitted from the controller 10. The delay measurement unit 403 calculates a round-trip communication delay from a difference between the reception time and the stored transmission time. Further, the delay measurement unit 403 calculates a one-way communication delay by dividing the calculated round-trip communication delay by two. Further, the delay measurement unit 403 inputs the calculated one-way communication delay to the logarithmic conversion unit 406A.

Next, the logarithmic conversion unit 406A logarithmically converts the one-way communication delay calculated in the step S101 (step S102). Then, the logarithmic conversion unit 406A inputs the logarithmically-converted communication delay to the smoothing unit 406B.

Next, the smoothing unit 406B smooths the one-way communication delay that has been logarithmically converted in the step S102 (step S103). Then, the smoothing unit 406B inputs the smoothed communication delay to the model learning unit 406C.

Further, the radio-wave index value measurement unit 404 measures a radio-wave index value (step S104). Note that as described above, the sampling rate of the measurement of the radio-wave index value performed by the radio-wave index value measurement unit 404 may have any value as long as the value is equal to or lower than the sampling rate of the measurement of the communication delay performed by the delay measurement unit 403. Therefore, the timing of the measurement of the radio-wave index value performed by the radio-wave index value measurement unit 404 is not limited to the position in the step S104. In other words, the processing in the step S104 may be performed in parallel with those in the steps S101, S102 and S103. Further, the radio-wave index value measurement unit 404 inputs the measured radio-wave index value to the model learning unit 406C.

Next, the model learning unit 406C updates the learning model for estimating a communication delay by using the one-way communication delay smoothed in the step S103 and the radio-wave index value measured in the step S104 (step S105).

Next, the model learning unit 406C determines whether the number of learning samples in the step S105 is equal to or greater than a predetermined number (step S106).

In the step S106, when the number of learning samples in the step S105 is less than the predetermined number (step S106; No), the process returns to the step S101.

In the step S106, when the number of learning samples in the step S105 is equal to or greater than the predetermined number (step S106; Yes), the learning model generated by the model learning unit 406C is input to the learning model storage unit 406D, and the learning model storage unit 406D stores the received learning model (step S107). With this, the processing in the method for generating the learning model is finished.

Next, a method for controlling the drive unit 408B in the apparatus to be controlled 40 will be described with reference to FIG. 6.

Firstly, the communication unit 401 of the apparatus to be controlled 40 receives a control signal transmitted from the controller 10 (step S201). Further, the communication unit 401 inputs this control signal to the control signal receiving unit 405. Further, the control signal receiving unit 405 converts the control signal into a first operation amount x which is, for example, the number of revolutions of a motor or the like. Further, the control signal receiving unit 405 inputs the first operation amount x to the speed determination unit 408A.

Next, the radio-wave index value measurement unit 404 measures a radio-wave index value (step S202). Then, the radio-wave index value measurement unit 404 inputs the measured radio-wave index value to the communication delay estimation unit 407.

Next, the communication delay estimation unit 407 calculates an estimated communication delay value $d_{est}$ based on the radio-wave index value input from the radio-wave index value measurement unit 404 and the learning model stored in the learning model storage unit 406D (step S203). Then, the communication delay estimation unit 407 inputs the estimated communication delay value $d_{est}$ to the speed determination unit 408A of the control unit 408.

Next, the speed determination unit 408A calculates a second operation amount y that will be input to the drive unit 408B based on the estimated communication delay value $d_{est}$ input from the communication delay estimation unit 407 and the first operation amount x input from the control signal receiving unit 405 (step S204). Specifically, the speed determination unit 408A calculates the second operation amount y by using the above-shown Expressions (1) and (2).

Next, the speed determination unit 408A inputs the second operation amount y to the drive unit 408B and thereby operates the drive unit 408B. The drive unit 408B operates according to the second operation amount y input from the speed determination unit 408A (step S205). Specifically, in the case where the second operation amount y is a rotation speed of a motor, the motor, which is the drive unit 408B, rotates at a rotation speed determined by the second operation amount y.

According to the apparatus to be controlled 40 in accordance with the first example embodiment described above, an estimated communication delay value can be calculated by using the radio-wave index value and the learning model. That is, the estimated communication delay value can be calculated without transmitting a packet from the apparatus to be controlled 40 to the controller 10. Further, the estimated communication delay value can be accurately calculated by using the learning model. Further, it is possible to appropriately calculate a second operation amount that is input to the drive unit 408B based on the accurately-calculated estimated communication delay value and the first operation amount input from the controller 10. Therefore, it is possible to improve the efficiency of work performed by the apparatus to be controlled 40. As a result, it is possible to provide an apparatus to be controlled 40 capable of accurately estimating a delay time and improving the efficiency of work.

Further, when the estimated communication delay value $d_{est}$ estimated by the communication delay estimation unit 407 exceeds the predetermined value $d_{th}$, the speed determination unit 408A calculates, as the second operation amount y, an operation amount smaller than the first operation amount x input from the controller 10. Specifically, when the estimated communication delay value $d_{est}$ estimated by the communication delay estimation unit 407 exceeds the predetermined value $d_{th}$, the speed determination unit 408A calculates the second operation amount y so that the calculated second operation amount y is equal to or less than the predetermined upper limit value $x_{max}$. Note that the upper limit value $x_{max}$ is a value equal to or less than the first operation amount x. In this way, it is possible, when the estimated communication delay value $d_{est}$ exceeds the predetermined value $d_{th}$, to limit the second operation amount y that is input to the drive unit 408B. Therefore, it is possible to reduce the amount of overshoot which occurs when the communication delay is long, and to improve the efficiency of work in the apparatus to be controlled 40.

Further, after the model learning unit 406C generates the learning model, the communication delay estimation unit 407 estimates the estimated communication delay value based on the radio-wave index value. Therefore, after the model learning unit 406C generates the learning model, the apparatus to be controlled 40 no longer needs to transmit/receive a measurement packet for measuring a communication delay to/from the controller 10. Therefore, it is possible to reduce the power consumption of the apparatus to be controlled 40 as compared to the measurement of a communication delay using a measurement packet. Further, the estimated communication delay value can be estimated without consuming any frequency band of the wireless access point 30, so that it is possible to prevent or reduce the decrease in the communication speed of other communication that is performed through the wireless access point 30.

Note that the present invention is not limited to the above-described example embodiments, and they may be modified as appropriate without departing from the spirit and scope of the invention. For example, the delay measurement unit 403 may measure a one-way communication delay time between the controller 10 and the apparatus to be controlled 40.

Note that although the present invention is described as a hardware configuration in the above-described example embodiments, the present invention is not limited to the hardware configurations. In the present invention, the processes in the flowcharts shown in FIGS. 5 and 6 can be implemented by having a CPU (Central Processing Unit) execute a computer program.

The whole or part of the embodiments disclosed above can be described as, but not limited to, the following supplementary notes.

(Supplementary Note 1)

An apparatus to be controlled wirelessly connected to a communication network and remotely controlled by a remote control apparatus through the communication network, the apparatuses to be controlled comprising:

a delay measurement unit configured to measure a communication delay between the remote control apparatus and the apparatus to be controlled;

a logarithmic conversion unit configured to logarithmically convert the measured communication delay;

a smoothing unit configured to smooth the logarithmically-converted communication delay;

a radio-wave index value measurement unit configured to measure a radio-wave index value;

a model learning unit configured to generate a learning model by which a logarithmically-converted and smoothed communication delay is estimated by using the measured radio-wave index value;

a communication delay estimation unit configured to calculate an estimated communication delay value by using the learning model and the radio-wave index value; and an operation amount calculation unit configured to calculate a second operation amount based on the estimated communication delay value and a first operation amount, the first operation amount being an operation amount input from the remote control apparatus, and the second operation amount being an operation amount that is input to a drive unit.

(Supplementary Note 2)

The apparatus to be controlled described in Supplementary note 1, wherein when the estimated communication delay value exceeds a predetermined value, the operation amount calculation unit calculates an operation amount smaller than the first operation amount input from the remote control apparatus as the second operation amount.

(Supplementary Note 3)

The apparatus to be controlled described in Supplementary note 1 or 2, wherein when the estimated communication delay value exceeds the predetermined value, the operation amount calculation unit calculates the second operation amount so that the calculated second operation amount is equal to or less than a predetermined upper limit value, and the upper limit value is equal to or less than the first operation amount.

(Supplementary Note 4)

A control method performed by an apparatus to be controlled wirelessly connected to a communication network and remotely controlled by a remote control apparatus through the communication network, the control method comprising:

measuring, by the apparatus to be controlled, a communication delay between the remote control apparatus and the apparatus to be controlled;

logarithmically converting, by the apparatus to be controlled, the measured communication delay;

smoothing, by the apparatus to be controlled, the logarithmically-converted communication delay;

measuring, by the apparatus to be controlled, a radio-wave index value;

generating, by the apparatus to be controlled, a learning model by which a logarithmically-converted and smoothed communication delay is estimated by using the measured radio-wave index value;

calculating, by the apparatus to be controlled, an estimated communication delay value by using the learning model and the radio-wave index value; and calculating, by the apparatus to be controlled, a second operation amount based on the estimated communication delay value and a first operation amount, the first operation amount being an operation amount input from the remote control apparatus, and the second operation amount being an operation amount that is input to a drive unit.

(Supplementary Note 5)

The control method described in Supplementary note 4, wherein when the estimated communication delay value exceeds a predetermined value, the apparatus to be controlled calculates, when calculating the second operation value, an operation amount smaller than the first operation amount input from the remote control apparatus as the second operation amount.

(Supplementary Note 6)

The control method described in Supplementary note 4 or 5, wherein when the estimated communication delay value exceeds a predetermined value, the apparatus to be controlled calculates, when calculating the second operation value, the second operation amount so that the calculated second operation amount is equal to or less than a predetermined upper limit value, and the upper limit value is equal to or less than the first operation amount.

(Supplementary Note 7)

A non-transitory computer readable medium for an apparatus to be controlled wirelessly connected to a communication network and remotely controlled by a remote control apparatus through the communication network, the non-transitory computer readable medium being adapted to cause a computer to perform:

a process for measuring a communication delay between the remote control apparatus and the apparatus to be controlled;

a process for logarithmically converting the measured communication delay;

a process for smoothing the logarithmically-converted communication delay;

a process for measuring a radio-wave index value;

a process for generating a learning model by which a logarithmically-converted and smoothed communication delay is estimated by using the measured radio-wave index value;

a process for calculating an estimated communication delay value by using the learning model and the radio-wave index value; and a process for calculating a second operation amount based on the estimated communication delay value and a first operation amount, the first operation amount being an operation amount input from the remote control apparatus, and the second operation amount being an operation amount that is input to a drive unit.

(Supplementary Note 8)

The non-transitory computer readable medium described in Supplementary note 7, wherein when the estimated communication delay value exceeds a predetermined value, the computer calculates, in the process for calculating the second operation value, an operation amount smaller than the first operation amount input from the remote control apparatus as the second operation amount.

(Supplementary Note 9)

The non-transitory computer readable medium described in Supplementary note 7 or 8, wherein when the estimated communication delay value exceeds a predetermined value, the computer calculates, in the process for calculating the second operation value, the second operation amount so that the calculated second operation amount is equal to or less than a predetermined upper limit value, and the upper limit value is equal to or less than the first operation amount.

(Supplementary Note 10)

A remote control system comprising: a remote control apparatus; and an apparatus to be controlled connected to the remote control apparatus through a communication network, wherein the apparatus to be controlled is wirelessly connected to the communication network, and the apparatus to be controlled comprises:

a delay measurement unit configured to measure a communication delay between the remote control apparatus and the apparatus to be controlled;

a logarithmic conversion unit configured to logarithmically convert the measured communication delay;

a smoothing unit configured to smooth the logarithmically-converted communication delay;

a radio-wave index value measurement unit configured to measure a radio-wave index value;

a model learning unit configured to generate a learning model by which a logarithmically-converted and smoothed communication delay is estimated by using the measured radio-wave index value;

a communication delay estimation unit configured to calculate an estimated communication delay value by using the learning model and the radio-wave index value; and an operation amount calculation unit configured to calculate a second operation amount based on the estimated communication delay value and a first operation amount, the first operation amount being an operation amount input from the remote control apparatus, and the second operation amount being an operation amount that is input to a drive unit.

(Supplementary Note 11)

The remote control system described in Supplementary note 10, wherein when the estimated communication delay value exceeds a predetermined value, the operation amount calculation unit calculates an operation amount smaller than the first operation amount input from the remote control apparatus as the second operation amount.

(Supplementary Note 12)

The remote control system described in Supplementary note 10 or 11, wherein when the estimated communication delay value exceeds the predetermined value, the operation amount calculation unit calculates the second operation amount so that the calculated second operation amount is equal to or less than a predetermined upper limit value, and the upper limit value is equal to or less than the first operation amount.

Although the present disclosure is explained above with reference to example embodiments, the present disclosure is not limited to the above-described example embodiments. Various modifications that can be understood by those skilled in the art can be made to the configuration and details of the present disclosure within the scope of the invention.

This application is based upon and claims the benefit of priority from Japanese patent application No. 2018-112819, filed on Jun. 13, 2018, the disclosure of which is incorporated herein in its entirety by reference.

It is possible to provide an apparatus to be controlled, a remote control method, a non-transitory computer readable medium, and a remote control system capable of accurately estimating a delay time and improving the efficiency of work.

REFERENCE SIGNS LIST

100 REMOTE CONTROL SYSTEM
10 CONTROLLER (REMOTE CONTROL UNIT)
20 COMMUNICATION NETWORK
30 WIRELESS ACCESS POINT
40 APPARATUS TO BE CONTROLLED
401 COMMUNICATION UNIT
402 SAMPLING RATE DETERMINATION UNIT
403 DELAY MEASUREMENT UNIT
404 RADIO-WAVE INDEX VALUE MEASUREMENT UNIT
405 CONTROL SIGNAL RECEIVING UNIT
406 LEARNING UNIT
406A LOGARITHMIC CONVERSION UNIT
406B SMOOTHING UNIT
406C MODEL LEARNING UNIT
406D LEARNING MODEL STORAGE UNIT
407 COMMUNICATION DELAY ESTIMATION UNIT
408 CONTROL UNIT
408A SPEED DETERMINATION UNIT (OPERATION AMOUNT CALCULATION UNIT)
408B DRIVE UNIT

The invention claimed is:

1. An apparatus to be controlled wirelessly connected to a communication network and remotely controlled by a remote-control apparatus through the communication network, the apparatuses to be controlled comprising:

a delay measurement unit configured to measure a communication delay between the remote-control apparatus and the apparatus to be controlled;

a logarithmic conversion unit configured to logarithmically convert the measured communication delay;

a smoothing unit configured to smooth the logarithmically-converted communication delay;

a radio-wave index value measurement unit configured to measure a radio-wave index value;

a model learning unit configured to generate a learning model by which a logarithmically-converted and smoothed communication delay is estimated by using the measured radio-wave index value;

a communication delay estimation unit configured to calculate an estimated communication delay value by using the learning model and the radio-wave index value; and an operation amount calculation unit configured to calculate a second operation amount based on the estimated communication delay value and a first operation amount, the first operation amount being an operation amount input from the remote control apparatus, and the second operation amount being an operation amount that is input to a drive unit.

2. The apparatus to be controlled according to claim 1, wherein when the estimated communication delay value exceeds a predetermined value, the operation amount calculation unit calculates an operation amount smaller than the first operation amount input from the remote control apparatus as the second operation amount.

3. The apparatus to be controlled according to claim 1, wherein when the estimated communication delay value exceeds the predetermined value, the operation amount calculation unit calculates the second operation amount so that the calculated second operation amount is equal to or less than a predetermined upper limit value, and the upper limit value is equal to or less than the first operation amount.

4. A control method performed by an apparatus to be controlled wirelessly connected to a communication network and remotely controlled by a remote control apparatus through the communication network, the control method comprising:

measuring, by the apparatus to be controlled, a communication delay between the remote control apparatus and the apparatus to be controlled;

logarithmically converting, by the apparatus to be controlled, the measured communication delay;

smoothing, by the apparatus to be controlled, the logarithmically-converted communication delay;

measuring, by the apparatus to be controlled, a radio-wave index value;

generating, by the apparatus to be controlled, a learning model by which a logarithmically-converted and smoothed communication delay is estimated by using the measured radio-wave index value;

calculating, by the apparatus to be controlled, an estimated communication delay value by using the learning model and the radio-wave index value; and calculating, by the apparatus to be controlled, a second operation amount based on the estimated communication delay value and a first operation amount, the first operation amount being an operation amount input from the remote control apparatus, and the second operation amount being an operation amount that is input to a drive unit.

5. The control method according to claim 4, wherein when the estimated communication delay value exceeds a predetermined value, the apparatus to be controlled calculates, when calculating the second operation value, an operation amount smaller than the first operation amount input from the remote control apparatus as the second operation amount.

6. The control method according to claim 4, wherein when the estimated communication delay value exceeds a predetermined value, the apparatus to be controlled calculates, when calculating the second operation value, the second operation amount so that the calculated second operation amount is equal to or less than a predetermined upper limit value, and
the upper limit value is equal to or less than the first operation amount.

7. A non-transitory computer readable medium for an apparatus to be controlled wirelessly connected to a communication network and remotely controlled by a remote control apparatus through the communication network, the non-transitory computer readable medium being adapted to cause a computer to perform:
a process for measuring a communication delay between the remote control apparatus and the apparatus to be controlled;
a process for logarithmically converting the measured communication delay;
a process for smoothing the logarithmically-converted communication delay;
a process for measuring a radio-wave index value;
a process for generating a learning model by which a logarithmically-converted and smoothed communication delay is estimated by using the measured radio-wave index value;
a process for calculating an estimated communication delay value by using the learning model and the radio-wave index value; and
a process for calculating a second operation amount based on the estimated communication delay value and a first operation amount, the first operation amount being an operation amount input from the remote control apparatus, and the second operation amount being an operation amount that is input to a drive unit.

8. The non-transitory computer readable medium according to claim 7, wherein when the estimated communication delay value exceeds a predetermined value, the computer calculates, in the process for calculating the second operation value, an operation amount smaller than the first operation amount input from the remote control apparatus as the second operation amount.

9. The non-transitory computer readable medium according to claim 7, wherein when the estimated communication delay value exceeds a predetermined value, the computer calculates, in the process for calculating the second operation value, the second operation amount so that the calculated second operation amount is equal to or less than a predetermined upper limit value, and
the upper limit value is equal to or less than the first operation amount.

* * * * *